(12) United States Patent
Jansseune

(10) Patent No.: US 8,407,676 B2
(45) Date of Patent: Mar. 26, 2013

(54) DEVICE AND A METHOD OF MANAGING A PLURALITY OF SOFTWARE ITEMS

(75) Inventor: Bart Jansseune, Bierbeek (BE)

(73) Assignee: NXP B.V. (NL)

( * ) Notice: Subject to any disclaimer, the term of this patent is extended or adjusted under 35 U.S.C. 154(b) by 608 days.

(21) Appl. No.: 12/664,430

(22) PCT Filed: Jun. 18, 2008

(86) PCT No.: PCT/IB2008/052399
§ 371 (c)(1),
(2), (4) Date: Dec. 14, 2009

(87) PCT Pub. No.: WO2008/155731
PCT Pub. Date: Dec. 24, 2008

(65) Prior Publication Data
US 2010/0175053 A1    Jul. 8, 2010

(30) Foreign Application Priority Data
Jun. 21, 2007   (EP) .................................... 07110780

(51) Int. Cl.
*G06F 9/44* (2006.01)
*G06F 9/45* (2006.01)
(52) U.S. Cl. ........ 717/133; 717/124; 717/127; 717/130; 717/131; 717/144; 717/151; 717/154; 717/157
(58) Field of Classification Search .................. None
See application file for complete search history.

(56) References Cited

U.S. PATENT DOCUMENTS

| 5,787,284 | A | * | 7/1998 | Blainey et al. ................. 717/144 |
| 5,790,865 | A | | 8/1998 | Smaalders et al. |
| 5,828,883 | A | * | 10/1998 | Hall .............................. 717/133 |
| 6,029,004 | A | | 2/2000 | Bortnikov et al. |
| 6,126,329 | A | * | 10/2000 | Bennett et al. ................. 717/133 |
| 7,367,024 | B2 | * | 4/2008 | Barua et al. ................... 717/157 |
| 7,509,632 | B2 | * | 3/2009 | Boger ........................... 717/133 |
| 7,886,272 | B1 | * | 2/2011 | Episkopos et al. ............. 717/124 |
| 8,336,033 | B2 | * | 12/2012 | Schmelter et al. ............. 717/131 |
| 2002/0129343 | A1 | * | 9/2002 | Pinter et al. ................... 717/140 |

(Continued)

FOREIGN PATENT DOCUMENTS

| CA | 2 166 254 A1 | 6/1997 |
| WO | 01/75590 A2 | 10/2001 |

(Continued)

OTHER PUBLICATIONS

Michael Burke et al., Interprocedural Dependence Analysis and Parallelization, ACM 1986 vol. 21 Issue 7, [Retrieved on Dec. 25, 2012]. Retrieved from the internet: <URL: http://dl.acm.org/citation.cfm?id=13328> 14 Pages (162-175).*

(Continued)

*Primary Examiner* — Don Wong
*Assistant Examiner* — Anibal Rivera
(74) *Attorney, Agent, or Firm* — Kramer & Amado P.C.

(57) ABSTRACT

A device (100) for managing a plurality of software items, the device (100) comprising an analysis unit (103) adapted for analyzing a functional correlation between the plurality of software items, and a grouping unit (105) adapted for grouping functionally correlated ones of the plurality of software items together in a common memory space.

17 Claims, 7 Drawing Sheets

U.S. PATENT DOCUMENTS

| | | | |
|---|---|---|---|
| 2003/0066055 A1* | 4/2003 | Spivey | 717/131 |
| 2004/0163077 A1* | 8/2004 | Dimpsey et al. | 717/130 |
| 2005/0044538 A1* | 2/2005 | Mantripragada | 717/151 |
| 2005/0132336 A1* | 6/2005 | Gotwals et al. | 717/127 |
| 2008/0196017 A1* | 8/2008 | Ritzau et al. | 717/154 |

FOREIGN PATENT DOCUMENTS

| | | |
|---|---|---|
| WO | 2004/006095 A1 | 1/2004 |

OTHER PUBLICATIONS

Sudarshan S. Chawathe et al., Comparing Hierarchical Data in external Memory, ACM 1982 vol. 17 Issue 6, [Retrieved on Dec. 25, 2012]. Retrieved from the internet: <URL: http://dl.acm.org/citation.cfm?id=806987> 12 Pages (120-126).*

International Search Report for Application No. PCT/IB2008/052399 (Oct. 31, 2008).

* cited by examiner

DEVICE AND A METHOD OF MANAGING A PLURALITY OF SOFTWARE ITEMS

FIELD OF THE INVENTION

The invention relates to a device for managing a plurality of software items.

Beyond this, the invention relates to a method of managing a plurality of software items.

Moreover, the invention relates to a program element.

Furthermore, the invention relates to a computer-readable medium.

The invention further relates to an audio data processing apparatus.

BACKGROUND OF THE INVENTION

For high volume portable multimedia products such as mobile phones and music players, system design focuses on power consumption and silicon area. An embedded memory (ISRAM) has lower power consumption and is faster than an external memory such as an SDRAM. However, ISRAM size has a large impact on the die area and thus the selling price of a product. ISRAM is used by software for storing both code that is executed on an embedded processor (ARM) and for storing data.

Nexperia™ Mobile Multimedia Processor PNX0103 technology facilitates fast download of content to mobile phones and portable flash storage devices, whilst reducing power consumption and increasing battery life on the move. With low power audio capabilities of the PNX0103, consumers can enjoy up to 100 hours of uninterrupted audio playback on their MP3 players. The PNX0103 incorporates a USB controller that enables efficient data transfer between the media player and other USB peripheral devices such as PCs. It is also equipped with interfaces to wireless or Bluetooth interconnectivity modules.

In the PNX0103, a management architecture may be used that loads code from an external storage source like a NAND flash when the ARM requires the instruction (On-Demand-Paging, ODP). An ARM infrastructure, which may be used to enable this, is the Memory Management Unit (MMU) and the data and instruction abort handlers. The MMU provides a logical to physical mapping of the ARM memory space. A fine grained mapping relates to 4 kB or 1 kB pages. This may also be the granularity of the ODP pages.

The amount of page loads influences the system performance, since cycles spent during loading cannot be used for anything else, and also power consumption since accessing the storage device and ARM cycles consume power. Standard linking technology does not take into account these page boundaries. This can cause frequently executed code sharing the same pages as infrequently used code and can cause a function to span two pages even though it is significantly smaller than a page size.

WO 2004/006095 A1 discloses a method, for use in a processor, including mapping a first data access having less than a predetermined memory footprint to a first memory area, and mapping a second data access having greater than the predetermined memory footprint to a second memory area. The method may also include compiling computer code, inserting annotations into an intermediate representation of the computer code generated during compiling, propagating the annotations from the intermediate representation to a low-level is representation of the computer code generated during compiling, and inserting instructions into the low-level representation, the instructions controlling mapping of the first data and the second data.

However, conventional software management systems may suffer from an inefficient access to different software items of an algorithm, thus rendering access to the software slow and resulting in a high electrical power demand.

OBJECT AND SUMMARY OF THE INVENTION

It is an object of the invention to provide a software management system allowing for an efficient access to software items.

In order to achieve the object defined above, a device for managing a plurality of software items, a method of managing a plurality of software items, a program element, a computer-readable medium, and an audio data processing apparatus according to the independent claims are provided.

According to an exemplary embodiment of the invention, a device for managing (or ordering or linking) a plurality of software items (such as multiple software routines or program components) is provided, the device comprising an analysis unit adapted for analyzing a functional correlation between the plurality of software items (particularly for detecting which software items call which other software items), and a grouping unit adapted for grouping functionally correlated ones of the plurality of software items together in a common memory space (particularly for storing several software items calling each other in a linked manner or in a dedicated portion of a memory, for instance in a manner that linked software items are copyable together from the (external) memory to another (external) storage entity, and are copyable independently of other software items lacking a link to the linked group of software items).

According to another exemplary embodiment of the invention, a method of managing a plurality of software items is provided, the method comprising analyzing a functional correlation between the plurality of software items, and grouping functionally correlated ones of the plurality of software items together in a common memory space.

According to still another exemplary embodiment of the invention, a program element (for instance a software routine, in source code or in executable code) is provided, which, when being executed by a processor (such as a microprocessor or a CPU which may be configured to optimize code locality for subsequent efficient access to ordered software code by another processor), is adapted to control or carry out a software linking method having the above mentioned features.

According to yet another exemplary embodiment of the invention, a computer-readable medium (for instance a CD, a DVD, a USB stick, a floppy disk or a harddisk) is provided, in which a computer program is stored which, when being executed by a processor (such as a microprocessor or a CPU), is adapted to control or carry out a software linking method having the above mentioned features.

According to still another exemplary embodiment of the invention, an audio data processing (or playback) apparatus (such as a mobile phone or an MP3 player) for processing audio data is provided, the audio data processing apparatus comprising a memory unit adapted for storing a plurality of software items grouped in accordance with a method of managing a plurality of software items having the above mentioned features, and a processor unit adapted for processing the audio data by (selectively) accessing grouped ones of the plurality of software items stored in the memory unit.

Data processing for software linking purposes which may be performed according to embodiments of the invention can be realized by a computer program, that is by software, or by using one or more special electronic optimization circuits, that is in hardware, or in hybrid form, that is by means of software components and hardware components.

In the context of this application, the term "software items" may particularly denote program code elements, subroutines, or any other computer-readable code, which is capable of executing a specific function or partial function. Such software items may be provided in source code or in executable code. A plurality of such software items may be stored in a program library for access by a processor, which may execute one or a combination of such software items.

The term "managing software items" may particularly denote a scheme of handling access of a processor to such linked software items and/or a storage architecture for such software items.

The term "functional correlation between software items" may particularly denote a linkage of different ones of the software items in such a manner that a computer task is executed by a combination of such functionally correlated software items in accordance with a linkage scheme defining an order of an execution of the linked software items. For instance, parent nodes of a call-graph may call one or more child nodes so as to perform, in combination, a computer task.

The term "grouping functionally correlated software items in a common memory space" may particularly denote that a number of linked or cooperating computer program items are stored together in an addressable memory portion, that is to say with code locality adjusted in accordance with a co-function of different software items function together, whereas other software items do not function together.

The term "call-graph" may particularly denote a logical tree-like architecture according to which a plurality of parent and child nodes each indicative of a specific program code are coupled or functionally linked Such a call-graph may be a hierarchical structure indicative of an order according to which different program items are to be executed so as to cooperate to perform a specific computer task.

The term "scatter file" may particularly denote a compile/link time memory map as an input for a linker.

The term "memory unit" may particularly denote a storage device such as an EEPROM which is capable of storing software items in accordance with a specific structure, for instance in accordance with ODP (On Demand Paging) pages. Thus, the structure according to which different software items are stored in a memory unit may also have an influence on the way of reading out or copying portions of the memory to another memory coupled with a processor.

The term "processor unit" may particularly denote any processing resource such as a CPU (central processing unit) or a microprocessor, which is capable of executing code for carrying out a specific function, particularly in the context of audio data processing. In this context, it may happen that the processor copies a portion of the memory unit into a closely related other memory unit. Embodiments of the invention may allow reducing a copy burden by providing efficient software storage architecture.

According to an exemplary embodiment of the invention, the linkage between different segments or components of a software library is analyzed, and identified groups of correlated or cooperating components or segments are stored in specific portions of a memory. By taking this measure, in the case of access to a specific function fulfilled by some of the software items, only a small portion has to be copied from the memory to the processor, namely the portion which has been identified beforehand as a subgroup of the software items which are required to fulfill the specific function.

For instance, a music player chip may copy code from an external memory to an internal (faster) memory. According to an exemplary embodiment of the invention, a selective portion of the memory is copied only, namely a set of functions necessary for performing a specific task, thereby avoiding unnecessary copying and rendering the software access scheme fast. In other words, intelligence may be added to a linking procedure for linking the different software items. This may be performed in such a manner that the linker knows which functions call each other, and correlated links may be located closely together. This may result in a less amount of memory to be copied, thereby reducing the access time.

For example, a processor such as a PNX103 chip may perform tasks such as decoding of songs, audio amplification, processing for playing back songs, etc. A memory management unit (MMU) may map logical addresses to physical addresses (and can enable/disable specific areas). During the processing work of the processor, several programs may be required for executing the specific function. Only copying of specific pages of an external memory, which is required for such an execution, may then be performed in a selective manner. Therefore, a system may be provided which instructs a linker in a better way to improve linking For this purpose, it may be defined which components are part of a program task and where in the memory they will be loaded.

According to an exemplary embodiment of the invention, a corresponding linking procedure is performed, wherein a linker may tell which function fits into which page. Correspondingly, dedicated logical areas or functionally correlated items may be created, and a scatter file may tell the system which program elements fit together. Thus, according to an exemplary embodiment, a method of instructing a linker to place functions that call each other closely together in a memory space may be provided.

According to an exemplary embodiment of the invention, a method of improving or optimizing code locality may be provided which uses a call-graph of the code and knowledge of the size of each code segment in the graph to provide for powerful and efficient software linking.

According to an exemplary embodiment of the invention, a method of linking code from an external storage source to group code segments together is provided such that the amount of page misses is reduced, performing the steps of extracting symbols and sizes out of a library, extracting a call-graph, and linking the code using an information of sizes and call-graph. This may allow to obtain an improved system performance, since cycles spent during loading can be used for any other task, and hence also power consumption may be reduced since less cycles are needed accessing the storage device.

Exemplary fields of application of exemplary embodiments of the invention are portable devices such as audio/video players and mobile phones.

According to an exemplary embodiment, a power efficient software-linking scheme is provided so that an algorithm may be provided to optimize code locality to hence obtain reduced power consumption at small latencies. Such an algorithm may group code segments together, using standard linking tools such that the amount of page misses may be reduced.

In contrast to this, a default link strategy would need to place all functions in the ODP memory in an arbitrary, sequential way in the pages without taking into account page sizes (so a small function could span two pages) or call tree relationships (for instance five small functions that are in the same call tree could force the loading of five pages that are marginally used).

The inventor estimated that about 10% of pages are loaded because they contain a function that spans two pages, and that the code executed of the loaded pages may be less than 40%. Therefore, efficiency of the ODP algorithm may be easily increased by 50% or more if implementing exemplary embodiments of the invention.

A straightforward manual concept would involve analyzing the memory map file for a certain built, identifying inefficiently constructed pages, moving those functions to separate files and writing specific execution sections (page) for related functions.

According to an exemplary embodiment of the invention, an ARM linker (for instance of a PNX0103 system) may support extracting symbols and sizes out of a library, extracting a cell graph, and linking the code using a scatter file with user-defined execution regions. Such an algorithm may use information of sizes in a call-graph to create a custom scatter file such that the linker may order the symbols in a very efficient way. Exemplary processors, which may employ schemes of embodiments of the invention, are PNX0103, PNX0130, and PNX0131 processors.

According to an exemplary embodiment of the invention, power efficient linking may be made possible. Exemplary embodiments of the invention also provide algorithms to reorder procedures without having the profile data available.

Such an algorithm may be simplified with regard to a call-graph analysis, namely it is possible to non-look at the call-graph but just via best fill strategy avoiding page overflows. Furthermore, it is possible to feedback most used back traces for balancing the sub-graphs. It is also possible to perform a feedback of code coverage tools to split the code automatically (or manually) and code that gets executed during normal operation and exceptionally executed code. The philosophy of embodiments is that the ODP pages should contain as much as possible code that is actually executed. This kind of tooling can also be used in other paging software architecture such as LINUX™.

Next, further exemplary embodiments of the device for managing a plurality of software items will be explained. However, these embodiments also apply to the method of managing a plurality of software items, to the computer-readable medium, to the program element and to the audio data processing apparatus.

The device may comprise an extraction unit adapted for extracting a call-graph in the plurality of software items indicative of links between the plurality of software items. Such a call-graph may be a logical structure in which different nodes (for instance program elements in the computer language "C") calling each other are linked in a hierarchical structure of parent nodes and child nodes. Such a logical extraction may allow determining which portions of the software library are actually functionally linked to therefore be stored in a common memory space.

The analysis unit may further be adapted for analyzing the call-graph to determine the functional correlation between the plurality of software items. Particularly, each path from a top (parent) node to a bottom (child) node (via zero, one or multiple intermediate nodes) may be correlated to a specific function or task fulfilled by all the nodes in a logical order from the top node to the bottom node in combination.

Particularly, the analysis unit may be adapted for analyzing such paths in one or more call-graphs by starting at a child node at a bottom of the call-graph, moving upwardly in the call-graph to a parent node of the child node, and moving downwardly in the call-graph from the parent node to at least one further child node of the parent node. By such an iterative procedure, the correlations may be sampled in an efficient and reliable manner, providing a secure algorithm to capture all paths in the call-graph. An iterative procedure may be provided which performs a zigzag motion along the call-graph to sample the same. More particularly, the analysis unit may be adapted for further analyzing the paths by again moving upwardly in the call-graph to at least one further parent node of the at least one further child node. Thus, a layer-wise sampling or scanning of the call-graph in an upward and downward direction is made possible. The analysis unit may be adapted for further analyzing the paths by repeating the sequence of upward and downward movement until a top of the call-graph is reached. Therefore, the entire call-graph may be sampled to further increase the scanning range. An example for such a procedure will be described in more detail below referring to FIG. 5 to FIG. 11.

The analysis unit may be adapted for analyzing a size of individual ones of the plurality of software items as a basis for the grouping by the grouping unit. The size, that is to say the amount of storage space needed for storing the corresponding software items, may be stored which can be used as a decision criteria for copying or not copying an additional software item in a common memory space such as an ODP page. Furthermore, by taking into account the memory requirements of individual software items, it can be reliably ensured that no overflow occurs in a specific one of the common memory space portions (for instance ODP pages), and the management of the memory can be further refined.

The grouping unit may further be adapted for grouping functionally correlated ones of the plurality of software items in a manner to minimize a copy load for a processor accessing the plurality of software items. Thus, a criteria for grouping or linking the individual software components may be to keep the load of the data amount to be copied as small as possible. With this criterion in mind, a fast access to the structured software array is made possible.

The grouping unit may be adapted for grouping functionally correlated ones of the plurality of software items together in a common memory space callable by On Demand Paging. Using ODP pages as common memory spaces may allow to reduce the amount of data to be transferred or copied.

The grouping unit may be adapted for grouping further functionally correlated ones of the plurality of software items together in a second common memory space upon overflow of the first common memory space. When the memory capacity of a memory space such as an ODP page is exhausted, another common memory space in which closely linked and closely correlated software items are stored may be established.

A creation unit may be adapted for creating a scatter file indicative of the grouping of the functionally correlated ones of the plurality of software items. Such a creation unit may create a scatter file as a custom instruction which of the software items are to be grouped in which manner.

An updating unit may be provided and adapted for updating the grouping in accordance with a frequency of an access of a processor to a group of software items. In other words, after having used the structured software item system for a certain amount of time, frequently used and non-frequently used paths may be distinguished, and paths which are frequently used may be stored together. Therefore, a self-learning or self-adaptive system may be provided which becomes better and better the longer the system has been used in practice.

The apparatus for processing audio data may be realized as at least one of the group consisting of an audio surround system, a mobile phone, a headset, a loudspeaker, a hearing aid, a television device, a video recorder, a monitor, a gaming device, a laptop, an audio player, a DVD player, a CD player, a harddisk-based media player, an internet radio device, a public entertainment device, an MP3 player, a hi-fi system, a vehicle entertainment device, a car entertainment device, a medical communication system, a body-worn device, a speech communication device, a home cinema system, a home theatre system, a flat television, an ambiance creation device, a subwoofer, and a music hall system. Other applications are possible as well.

However, although the system according to an embodiment of the invention primarily intends to improve the processing of sound or audio data, it is also possible to apply the system for a combination of audio data and visual data. For instance, an embodiment of the invention may be implemented in audiovisual applications like a video player or a home cinema system in which a transition between different audiovisual items (such as music clips or video sequences) takes place.

The aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

DESCRIPTION OF EMBODIMENTS

Figure 1:
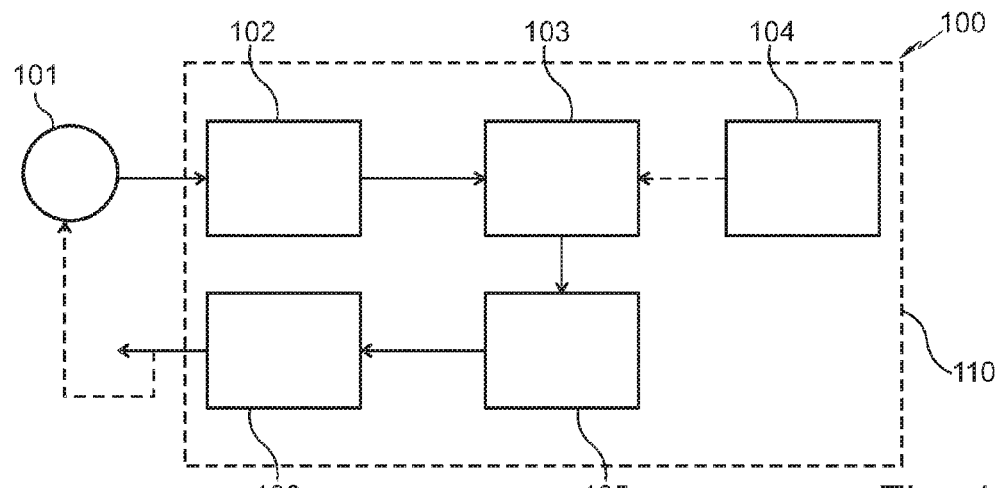
FIG. 1 illustrates a device for managing a plurality of software items according to an exemplary embodiment of the invention.

The illustration in the drawing is schematically. In different drawings, similar or identical elements are provided with the same reference signs.

In the following, referring to FIG. 1, a device 100 for managing a plurality of software items according to an exemplary embodiment of the invention will be explained.

The device 100 manages multiple software items, which are partially correlated, partially uncorrelated and which—in combination—serve to fulfill a plurality of computer-implemented tasks. According to an exemplary embodiment of the invention, the multiple software items are ordered, reordered or grouped so as to enable an efficient access to groups of the software items which are linked or functionally coupled, that is to say which call each other, to thereby keep an amount of data small which is to be copied from a software library to a processor or connected memory. In other words, when the software items are grouped in an optimum manner, the amount of data to be transferred from a memory storing the plurality of software items in an ordered manner to a processor may be minimized.

The device 100 comprises a storage unit 101 adapted for storing the plurality of software units. These software units may be supplied to an extraction unit 102 adapted for extracting a call-graph in the plurality of software items indicative of links between the plurality of software items. In other words, a call-graph as the one shown in FIG. 5 to FIG. 11 may be extracted by the extraction unit 102 and may be supplied to an analysis unit 103. The analysis unit 103 is adapted for analyzing functional correlations between the plurality of software items. More particularly, the analysis unit 103 analyzes the call-graph provided by the extraction unit 102 to determine, identify or detect possible functional correlations between the plurality of software items. For this purpose, a structure of parent and child nodes may be analyzed in the extracted call-graph(s) by the analysis unit 103. A specific scheme of analyzing a call-graph having parent and child nodes will be described below in more detail referring to FIG. 5 to FIG. 11.

During the analysis performed by the analysis unit 103, a size (that is to say a storage demand) of each of the plurality of software items may be taken into account. The result of the analysis is supplied from the analysis unit 103 to a grouping unit 105 which is adapted for grouping functionally correlated ones of the plurality of software items together in a common memory space. In other words, the grouping unit 105 links the individual software items in such a manner as to define functional groups or logical paths of software items which call each other.

The grouping unit 105 groups functionally correlated ones of the plurality of software items in a manner to minimize a copy load for a processor (not shown in FIG. 1) accessing the plurality of software items. This may be performed in the context of On Demand Paging. During grouping, the grouping unit 105 ensures that the software items stored in a common memory space (such as an ODP page) do not have a storage demand or sum data size which exceeds a size/capacity of the common memory space. Thus, undesired memory overflow may be prevented. If such a memory overflow occurs, a new memory space may be used for storage.

A result of the grouping is supplied to a creation unit 106 which creates a scatter file (provided at an output of the creation unit 106) indicative of the grouping of the functionally correlated ones of the plurality of software items. This scatter file may be supplied to a processor (such as a PC) as a basis for a scheme according to which individual ones or groups of the software items are to be accessed efficiently by another processor (such as a target platform, for instance PNX0103), without involving unnecessary copying. Furthermore, it is possible that the scatter file is stored in the storage unit 101 as a rule for accessing software items.

Furthermore, as shown in FIG. 1, an updating unit 104 may be provided optionally for updating the grouping scheme in accordance with a frequency of an access of a processor to group of software items. In other words, the practical experience regarding accesses of a processor to the multiple software items may be used to find and refine preferred paths between software items which are frequently used, and to find paths which are used not very frequently. Very frequently used paths (that is to say paths used more often than a threshold value) may then be grouped in a common memory space.

A common processing unit 110, such as a microprocessor or CPU, may perform tasks of components 102 to 106.

Figure 2:
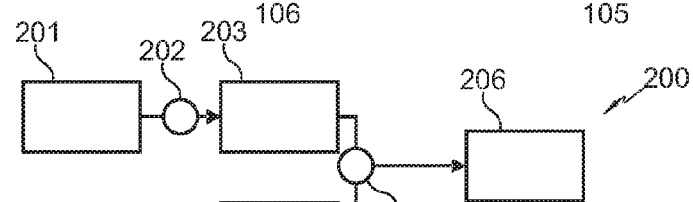
FIG. 2 illustrates a conventional On Demand Paging system.

FIG. 2 shows a scheme 200 illustrating a traditional build flow.

Traditionally, source files stored in a source file unit 201 are supplied to a compiler 202 for compiling. The compiled source files may then be supplied to an object library 203. Contents of a memory map or scatter file unit 204 in combination with the object library unit 203 may then be supplied to a linker unit 205 in order to link the individual software components. The result of this linking procedure may be supplied to a program binary unit 206.

Figure 3:
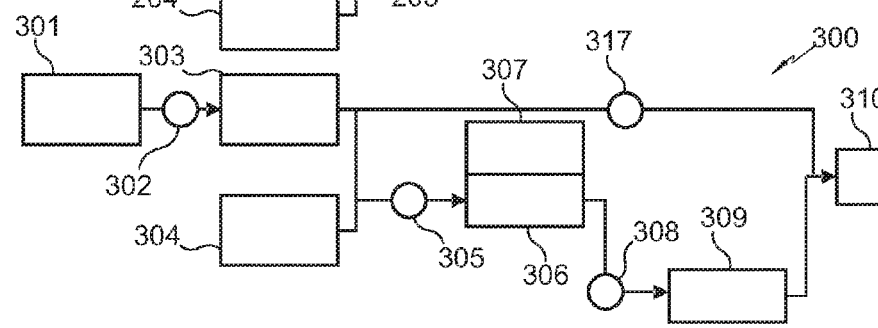
FIG. 3 illustrates an On Demand Paging system according to an exemplary embodiment of the invention.

In contrast to the simple tool step approach of FIG. 2, a scheme 300 according to an exemplary embodiment of the invention is illustrated in FIG. 3 and shows a build flow in which an output of a first step is used as an input for a second step.

Source files are contained in a source file unit 301 which may be compiled by a compiler 302, wherein the result of the compilation may be supplied to an object library unit 303. Contents of a memory map or scatter file unit 304 in combination with the object library 303 are supplied to first linker unit 305 to perform linking The result of this linking may be stored in a call-tree unit 306. The call-tree unit 306 is provided in common with a program binary unit 307.

Furthermore, an output of the object library unit 303 is supplied to a second linker unit 317 for performing a further linking procedure. The call-tree structure which may be stored in the call-tree unit 306 is supplied to a power efficient linker unit 308 which generates data supplied to a further memory map or scatter file unit 309. An output of the improved memory map or scatter file unit 309 in combination with an output of the second linker unit 317 is supplied to a program binary unit 310 as a global output.

Figure 4:
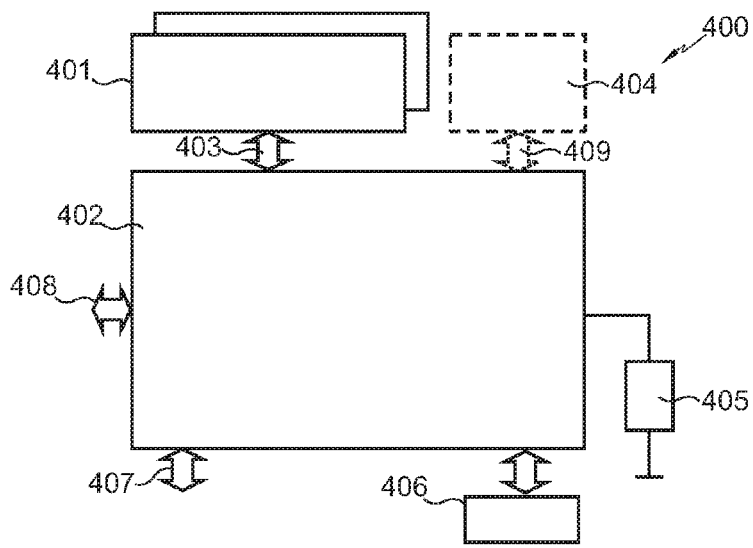
FIG. 4 illustrates an audio data processing apparatus according to an exemplary embodiment of the invention.

In the following, referring to FIG. 4, an audio data processing and playback apparatus 400 for processing audio data according to an exemplary embodiment of the invention will be explained.

The audio data processing unit 400 comprises a memory unit 401 adapted for storing a plurality of software items grouped in accordance with a method of managing a plurality of software items described above referring to FIG. 1 and FIG. 3. In other words, the program items are stored in the external storage source 401 (which may be an SLC/MLC NAND flash) in a structured or linked manner resulting from applying the method performed by the system of FIG. 1. As indicated by a double arrow 403, a processor unit 402 is adapted for processing audio data by processing grouped ones of the plurality of software items stored in the memory unit 401. The processor unit 402 may be a PNX0103 processor. The access interface 403 may function on the basis of On Demand Paging, wherein the processor 402 copies selective portions of the instructions stored in the flash memory 401.

An optional SDRAM unit 404 is provided which may be implemented for extended multimedia features, such as processing of video data, and which the processor 402 may access via a coupling interface 409. A battery 405 for power supply of the device 400 is shown as well as an LCD unit 406 for optical display of images. Keys may be provided via a key interface 407. A high-speed USB interface 408 is also provided.

In the following, referring to FIG. 5 to FIG. 11, an algorithm will be explained which is capable of identifying correlations between of individual software items.

Figure 5:
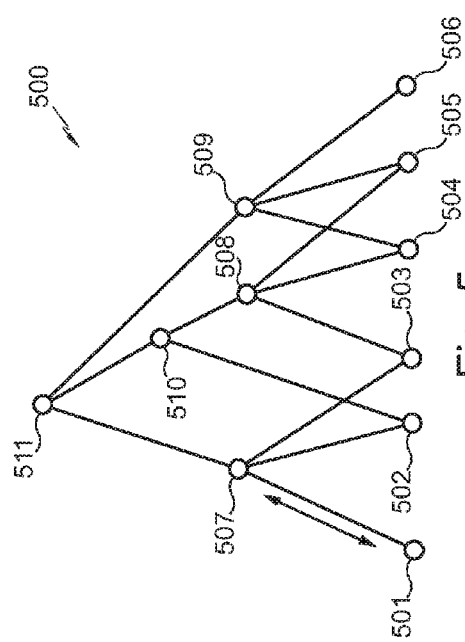
FIG. 5 to FIG. 11 illustrate call-graphs operated in accordance with an exemplary embodiment of the invention.

FIG. 5 shows a call-graph 500, which shows child nodes 501 to 506. In the hierarchical structure of FIG. 5, parent nodes of a first level 507, 508 and 509 are shown. In a second hierarchical level, a second order parent node 510 is shown, and in a third hierarchical level, a third order parent node 511 is shown. A parent node of a specific level calls a parent node of the next lower level, and the parent nodes of the lowest parent node level call correspondingly connected child nodes. All nodes 501 to 511 are C code functions. Each path from the top node 511 to one of the bottom nodes 501 to 506 corresponds to a specific computer implemented function or task which can be fulfilled by a program library formed by the plurality of nodes 501 to 511.

Figure 6:
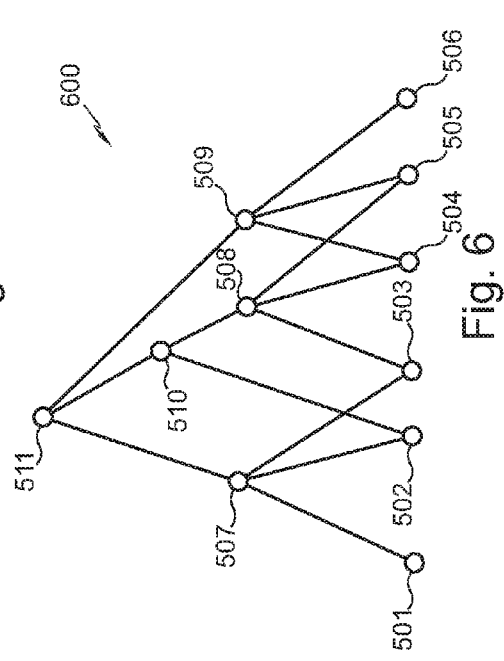

In a first step of the procedure, as illustrated in a scheme 600 shown in FIG. 6, a node 503 fulfilling a random function and having no child nodes is taken, and this is added to an ODP (On Demand Paging) page. As can be taken from FIG. 6, the procedure starts with one of the child nodes 501 to 506 at the bottom layer, in the present example the child node 503 is taken for the start. The start at the bottom layer is motivated by the fact that the child nodes 501 to 506 may be expected to be small ones or the smallest ones of the software items 501 to 511.

Figure 7:
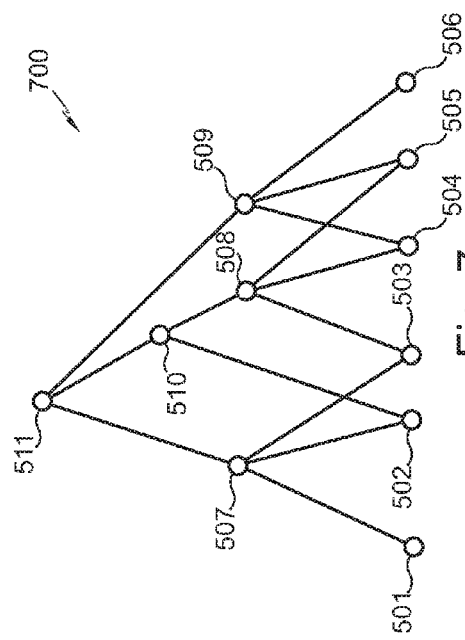

In a second step, as illustrated in a scheme 700 of FIG. 7, one of the parent nodes (in the present example the parent node 508) that is not part of another ODP page and that still fits into the ODP page is selected to be connected to the bottom child node 503. In other words, when going from FIG. 6 to FIG. 7, the procedure moves upwardly by one level.

Figure 8:
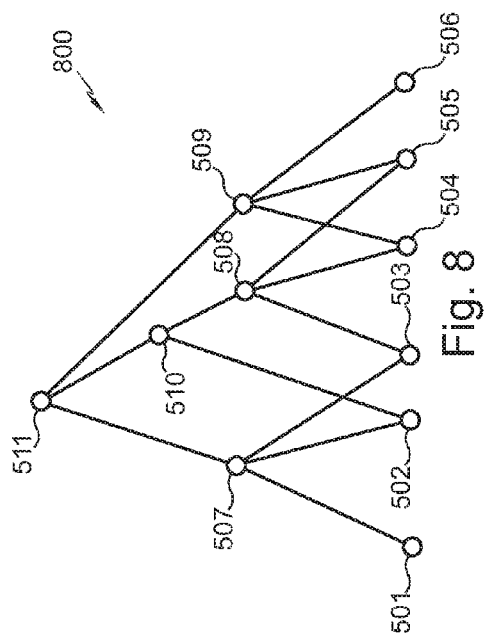

As can be taken from a scheme 800 shown in FIG. 8, the procedure goes down by one level in a third step. In this step, all further child nodes 504, 505 of the parent node 508, that are not part of any other ODP page are added to the present ODP page, as long as they fit into this ODP page.

Figure 9:
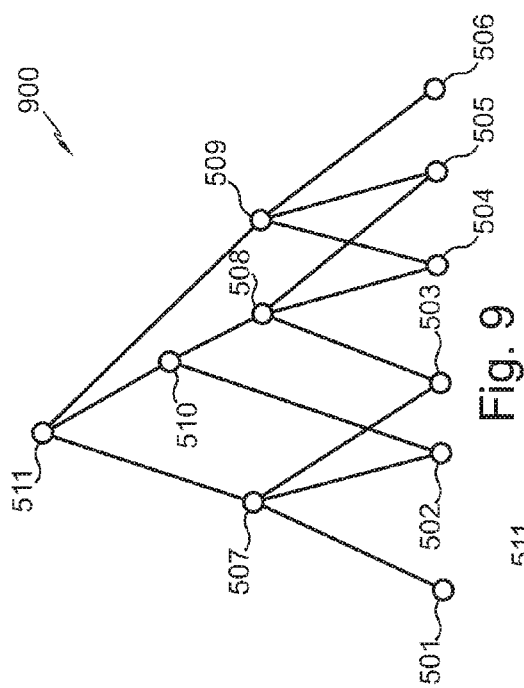

As can be taken from a scheme 900 shown in FIG. 9, in a fourth step, for each of the child nodes 504, 505 added in the previous third step, the procedure starts over at the second step, that is to say the procedure goes upwardly again reaching parent node 509.

Figure 10:
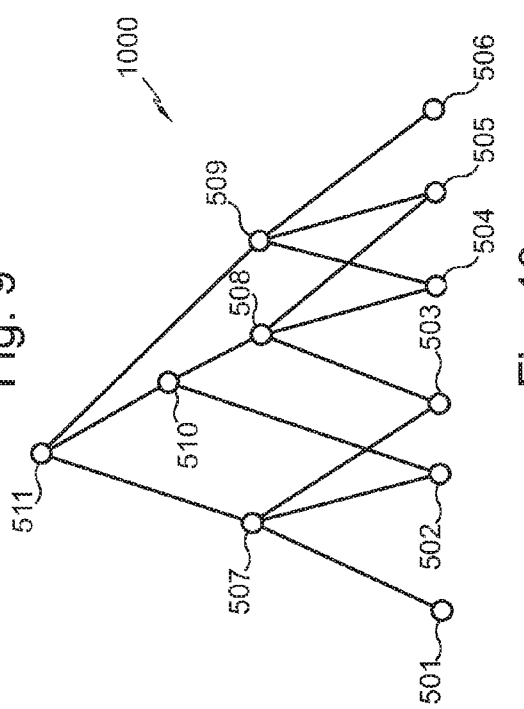

As can be taken from a scheme 1000 shown in FIG. 10, the procedure goes down and up again. In other words, in a fifth step, the procedure goes back to the second step and takes another parent node 507 and another child node 506.

Figure 11:
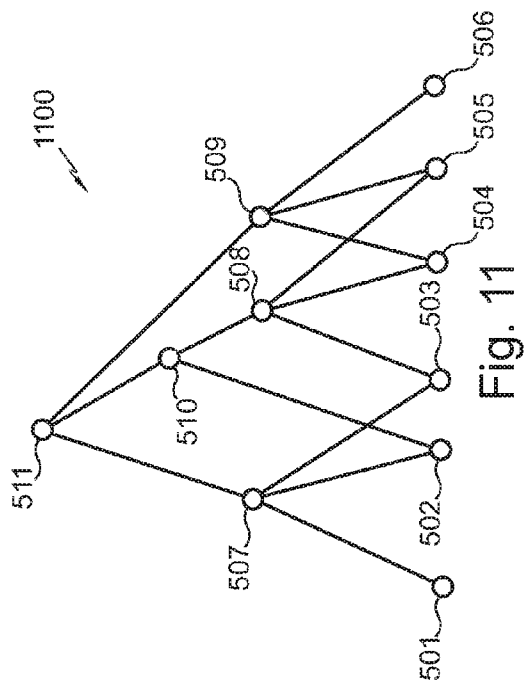

As can be taken from a scheme 1100 shown in FIG. 11, the system repeats the first step, thereby reaching the parent node 510 at a next higher level, that is to say above the level of the parent node 508.

The procedure can be repeated until all nodes 501 to 511 have been sampled.

If at any moment the ODP page is full, a new ODP page is started.

Functions 501 to 511 added to an ODP graph can be considered as removed from the call-graph 500. If the algorithm stops, it is possible to just look in the call-graph 500 for a function for which all child nodes are already added to the ODP pages, and this may be used in the second step.

Next, a pseudo-algorithm for the above-described procedure will be presented:

```
Process(node, type)
{
if (types = eParents)
{
∀ p∈ ParentsOf (node)
{
Add (p)
Process (p, eChildren)
}
∀ p∈ ParentsOf (node)
{
```

-continued

```
Process (p, eParents)
}
}
else
{
∀ c ∈ ChildrenOf (node)
{
Add (c)
}
∀ c ∈ ChildrenOf (node)
{
Process (c, eParents)
}
}
```

As an alternative to the described algorithm, it is possible to investigate the impact of alternative graph processing algorithms.

Figure 12:
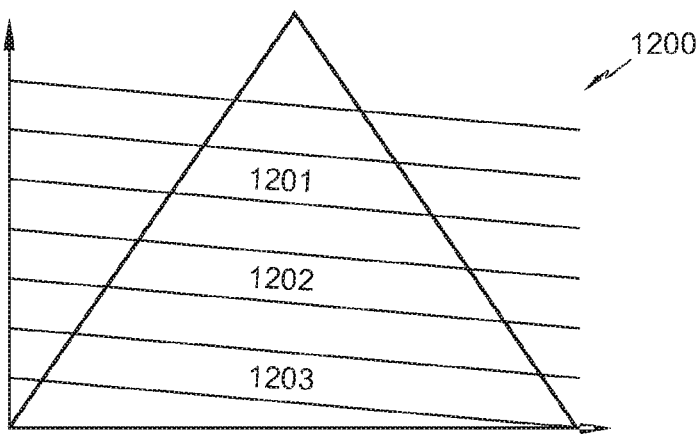
FIG. 12 to FIG. 14 show graphs in accordance with a parent child symbolism of algorithms according to exemplary embodiments of the invention.
Figure 13:
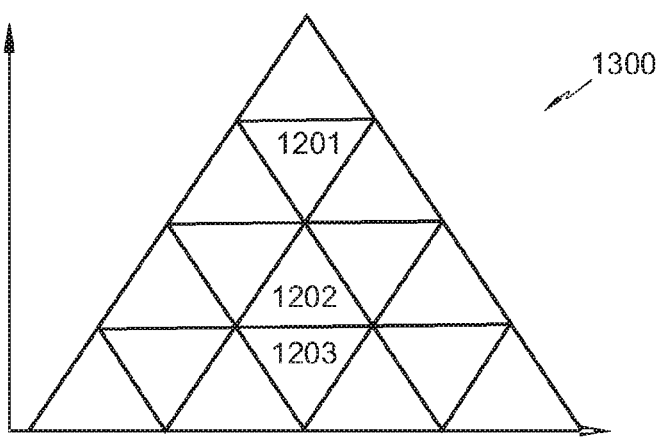
Figure 14:
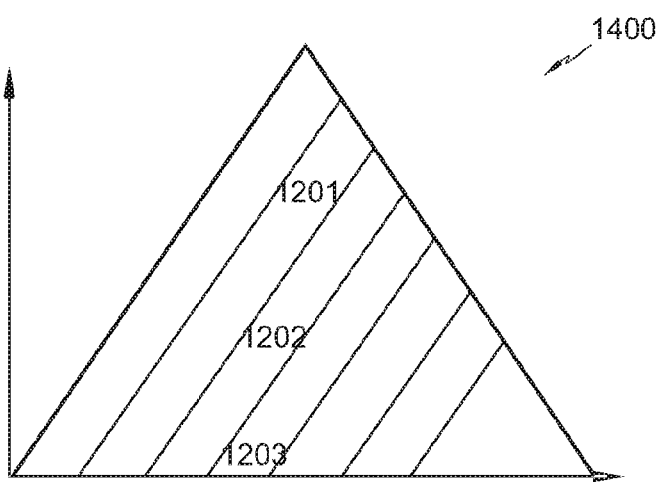

Using the parent child symbolism, the algorithm described above can be described in the manner as illustrated in the diagrams 1200 to 1400 shown in FIG. 12 to FIG. 14.

In each of these diagrams 1200 to 1400, a call-graph level is illustrated along the ordinates. An application level is denoted with reference numeral 1201, a middleware level is denoted with reference numeral 1202 and a drivers level is denoted with reference numeral 1203.

FIG. 12 refers to a "group by age" scheme.

FIG. 13 relates to a "group by family" scheme (only go to the higher level if all child nodes are included).

FIG. 14 relates to a "family tree" scheme (add all ancestors).

The grouping effect of ODP pages can be sketched in the diagrams of FIG. 12 to FIG. 14.

In the following, the On Demand Paging technology will be briefly explained which exemplary embodiments may implement to reduce page loads and thus reduce power consumption.

On Demand Paging provides a large virtual code space which is transparent to the programmer. It allows for real time loading, particularly when employing an SDRAM. Beyond this, it is a performance critical code executed out of ISRAM (192 kB). Therefore, it may be faster and more power efficient than the execution out of SDRAM. Furthermore, debugging with multiple software breakpoints may be enabled.

Figure 15:
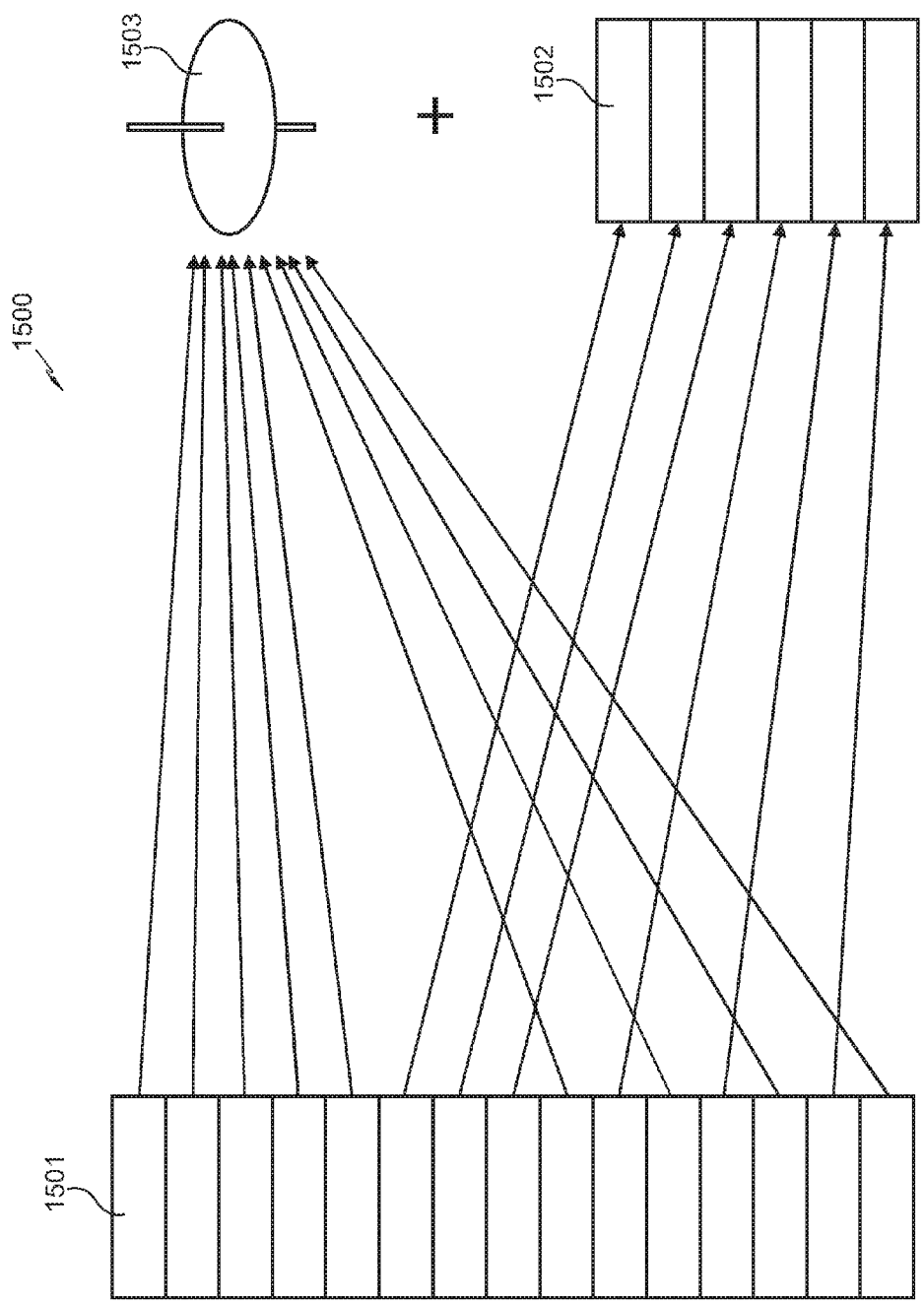
FIG. 15 illustrates On Demand Paging according to an exemplary embodiment of the invention.

FIG. 15 shows a scheme 1500 of On Demand Paging. A virtual memory 1501 is shown which can be mapped on a physical memory 1502. Furthermore, a second storage unit 1503 is shown.

Figure 16:
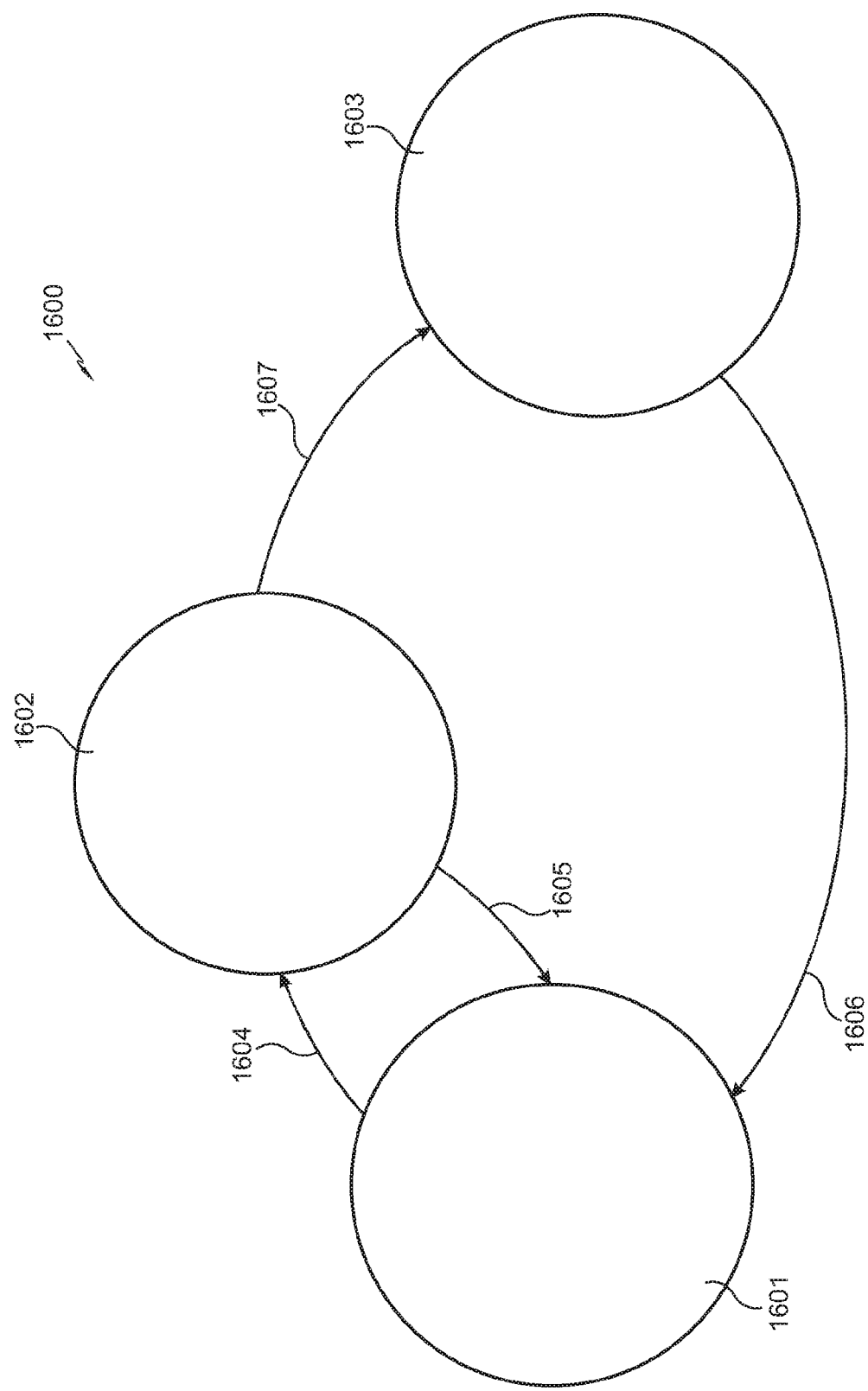
FIG. 16 illustrates a state machine of an On Demand Paging system according to an exemplary embodiment of the invention.

FIG. 16 illustrates an ODP state machine 1600.

A first state is an active state that is denoted with reference numeral 1601. A deprecated state is indicated by reference numeral 1602. An unloaded state is indicated by reference numeral 1603. Housekeeping/MMU inactive mode relates to an arrow 1604. An arrow 1605 relates to Referencing/MMU active. An arrow 1606 relates to Referencing/Loading+MMU Active. An arrow 1607 relates to an oldest state.

Figure 17:
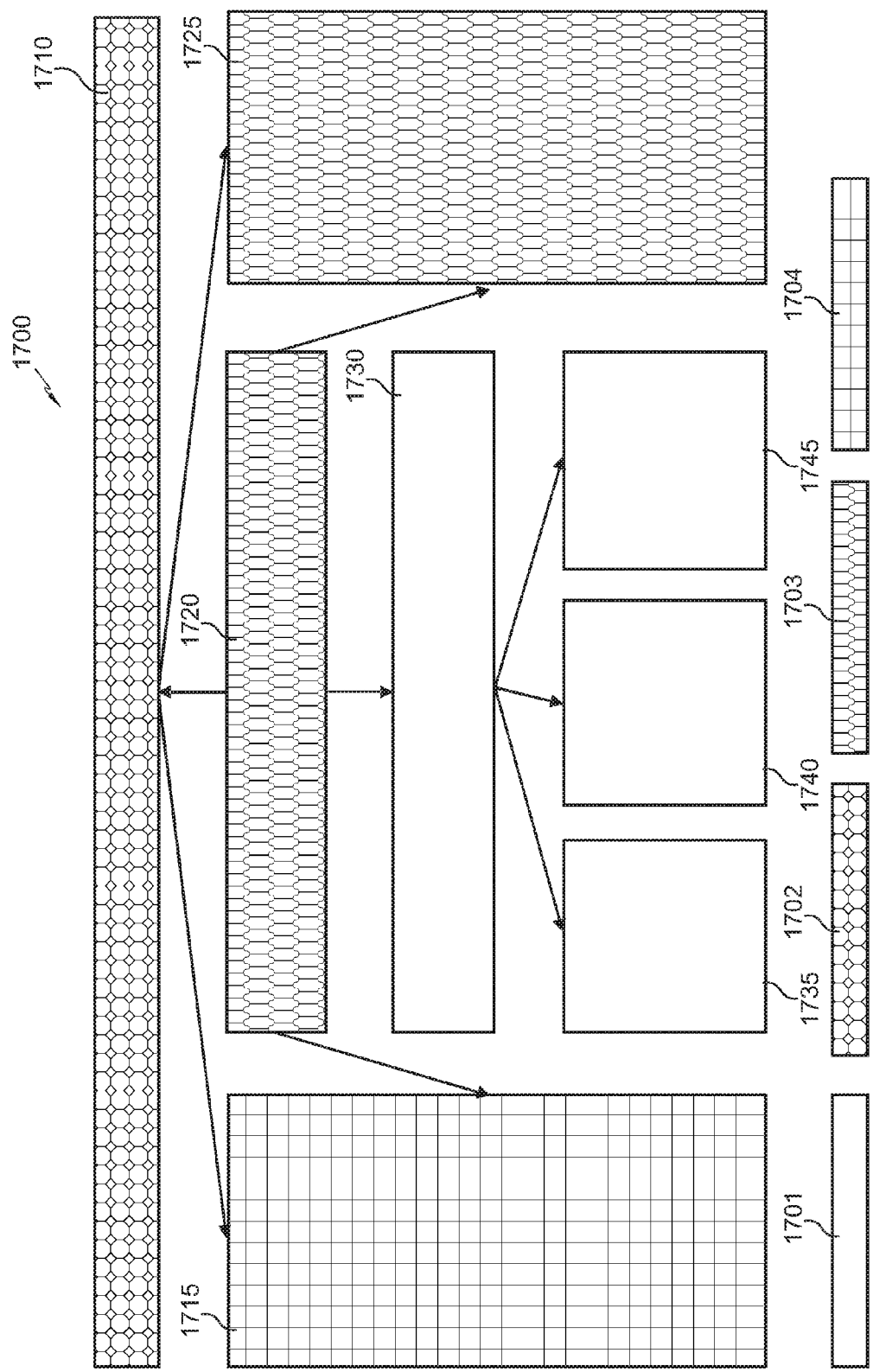
FIG. 17 shows an architecture of memory management according to an exemplary embodiment of the invention.

FIG. 17 is a scheme 1700, which illustrates memory management architecture 1700.

The legend of FIG. 17 shows a first box 1701 indicative of a ROM-based code. A second box 1702 is indicative of a dynamically loaded code. A third box 1703 is indicative of a code permanently in a RAM. A fourth box 1704 is indicative of a linker provided information.

A box 1710 illustrates an application or higher-level initialization software. This box 1710 accesses a box 1715 comprising scatter file and linker information (automatically synchronized). Box 1715 is also reached by a box 1720 denoted as a context box (which may contain an entry point). Box 1720 further accesses a box 1725, which is also accessed by the box 1710 and indicates an SDRAM driver. Furthermore, a box 1730 is shown which is accessed by the context box 1720 and schematically illustrates a program load manager. The program load manager box 1730 accesses an MMU driver box 1735, a cache driver box 1740 and a memory pool manager box 1745.

It should be noted that the term "comprising" does not exclude other elements or features and the "a" or "an" does not exclude a plurality. Also elements described in association with different embodiments may be combined.

It should also be noted that reference signs in the claims shall not be construed as limiting the scope of the claims.

The invention claimed is:

1. A device for managing a plurality of software items, the device comprising:
   an extraction unit adapted for extracting a hierarchical call-graph from the plurality of software items, the call-graph being indicative of links between the plurality of software items arranged in a hierarchical manner;
   an analysis unit adapted for analyzing a functional correlation between at least a part of the plurality of software items, the functional correlation indicating at least a parent node and a child node; and
   a grouping unit adapted for:
      starting at a child node at a bottom of the call-graph;
      adding, the child node to a common memory space;
      moving upwardly in the call-graph to a parent node of the child node;
      adding the parent node to the common memory space;
      moving downwardly in the call-graph from the parent node to at least one further child node of the parent node; and
      adding the further child node to the common memory space.

2. The device according to claim 1, wherein the analysis unit is adapted for analyzing the call-graph to determine the functional correlation between the plurality of software items.

3. The device according to claim 1, wherein the analysis unit is adapted for further analyzing the functional paths by moving upwardly in the call-graph to at least one further parent node of the at least one further child node and adding the further parent node to the common memory space.

4. The device according to claim 3, wherein the analysis unit is adapted for further analyzing the functional paths by repeating the upward and downward movements until a top node of the call-graph is reached.

5. The device according to claim 1, wherein the analysis unit is adapted for analyzing a size of the plurality of software items as a basis for the grouping by the grouping unit.

6. The device according to claim 1, wherein the grouping unit is adapted for grouping functionally correlated ones of the plurality of software items in a manner to minimize a copy load for a processor accessing the plurality of software items.

7. The device according to claim 1, wherein the grouping unit is adapted for grouping functionally correlated ones of the plurality of software items together in a common memory space callable by on demand paging.

8. The device according to claim 7, wherein the grouping unit is adapted for grouping further functionally correlated ones of the plurality of software items together in a further common memory space when a size of the functionally correlated ones of the plurality of software items exceed a storage capacity of the common memory space.

9. The device according to claim 1, further comprising a creation unit adapted for creating a scatter file indicative of a grouping characteristic of functionally correlated ones of the plurality of software items.

10. The device according to claim 1, further comprising an updating unit adapted for updating the grouping in accordance with a frequency of an access of a processor to a group of software items.

11. A method of managing a plurality of software items, the method comprising:
- extracting a hierarchical call-graph from the plurality of software items, the call-graph being indicative of links between the plurality of software items arranged in a hierarchical manner;
- analyzing a functional correlation between at least a part of the plurality of software items, the functional correlation indicating at east a anent node and a child node;
- starting at a child node at a bottom of the call-graph;
- adding the child node to a common memory space;
- moving upwardly in the call-graph to a parent node of the child node;
- adding the parent node to the common memory space;
- moving downwardly in the call-graph from the parent node to at least one further child node of the parent node; and
- adding the further child node to the common memory space.

12. A non-transitory computer-readable medium, encoded with instructions executable by a processor for managing a plurality of software items, wherein the non-transitory computer-readable medium comprises instructions for performing a method according to claim 11.

13. A program element of managing a plurality of software items, which program element, when being executed by a processor, is adapted to carry out or control a method according to claim 11.

14. An audio data processing apparatus for processing audio data, the audio data processing apparatus comprising a memory unit adapted for storing a plurality of software items grouped in accordance with the method of managing a plurality of software items of claim 11; a processor unit adapted for processing the audio data by accessing grouped ones of the plurality of software items stored in the memory unit.

15. The audio data processing apparatus according to claim 14, wherein the processor unit is adapted for accessing grouped ones of the plurality of software items stored in the memory unit without accessing software items stored in the memory unit which are not part of a group.

16. The audio data processing apparatus according to claim 14, wherein the processor unit is adapted for copying the accessed grouped ones of the plurality of software items from the memory unit into an internal memory.

17. The audio data processing apparatus according to claim 14, realized as at least one of the group consisting of an audio surround system, a mobile phone, a headset, a headphone playback apparatus, a loudspeaker playback apparatus, a hearing aid, a television device, a video recorder, a monitor, a gaming device, a laptop computer, an audio player, a DVD player, a CD player, a harddisk-based media player, a radio device, an internet radio device, a public entertainment device, an MP3 player, a hi-fi system, a vehicle entertainment device, a car entertainment device, a medical communication system, a body-worn device, a speech communication device, a home cinema system, a home theatre system, a flat television apparatus, an ambiance creation device, a subwoofer, and a music hall system.

* * * * *